United States Patent
Bennett et al.

(10) Patent No.: US 11,405,293 B2
(45) Date of Patent: Aug. 2, 2022

(54) SYSTEM AND METHOD FOR MANAGING IT ASSET INVENTORIES USING LOW POWER, SHORT RANGE NETWORK TECHNOLOGIES

(71) Applicant: Kyndryl, Inc., New York, NY (US)

(72) Inventors: Denise Ann Bennett, Tampa, FL (US); Jose Rizaldy Dela Pena Coronel, Poughkeepsie, NY (US); Victoria Lee Guerra, Yorktown Heights, NY (US); Clifford Vernon Harris, Travis, TX (US); Victor Rafael Herrero, Poughkeepsie, NY (US)

(73) Assignee: KYNDRYL, INC., New York, NY (US)

( * ) Notice: Subject to any disclaimer, the term of this patent is extended or adjusted under 35 U.S.C. 154(b) by 173 days.

(21) Appl. No.: 16/137,680

(22) Filed: Sep. 21, 2018

(65) Prior Publication Data
US 2020/0099602 A1    Mar. 26, 2020

(51) Int. Cl.
| H04L 12/00 | (2006.01) |
| H04L 43/0805 | (2022.01) |
| H04L 43/08 | (2022.01) |
| H04L 67/10 | (2022.01) |
| H04W 84/18 | (2009.01) |

(52) U.S. Cl.
CPC .......... *H04L 43/0805* (2013.01); *H04L 43/08* (2013.01); *H04L 67/10* (2013.01); *H04W 84/18* (2013.01)

(58) Field of Classification Search
CPC ..... H04W 84/18; H04W 43/08; H04W 67/10; H04W 43/0805

USPC ......................... 709/223, 216, 224
See application file for complete search history.

(56) References Cited

U.S. PATENT DOCUMENTS

| 7,151,938 | B2* | 12/2006 | Weigand | H04L 41/0681 455/452.1 |
| 7,508,803 | B2* | 3/2009 | Emeott | H04W 40/02 370/338 |
| 7,579,960 | B2* | 8/2009 | Cheng | G06F 16/9537 340/8.1 |
| 7,586,888 | B2* | 9/2009 | Wang | H04W 84/18 340/539.1 |
| 7,801,058 | B2* | 9/2010 | Wang | H04L 63/08 370/254 |
| 7,984,128 | B2* | 7/2011 | Vambenepe | G06Q 10/06 709/223 |
| 8,099,479 | B2* | 1/2012 | Saint-Hilaire | G06F 1/3203 709/220 |
| 8,244,260 | B2* | 8/2012 | Silverstrim | H04W 88/10 455/447 |
| 8,549,036 | B2* | 10/2013 | O'Connor | G06Q 10/06 707/776 |
| 8,553,536 | B2* | 10/2013 | Mayo | H04L 67/125 370/225 |

(Continued)

FOREIGN PATENT DOCUMENTS

WO    WO-2017171645 A1 * 10/2017   .......... H04W 40/244

*Primary Examiner* — Frantz Coby
(74) *Attorney, Agent, or Firm* — Ken Han, Esq.; McGinn IP Law Group, PLLC (57) ABSTRACT

A method of information technology (IT) asset management includes using a mesh network to report IT asset management data and receiving the IT asset management data from the mesh network at a collection server.

20 Claims, 7 Drawing Sheets

(56) References Cited

U.S. PATENT DOCUMENTS

| | | | |
|---|---|---|---|
| 8,558,694 B2 | 10/2013 | Brandt et al. | |
| 8,626,178 B2* | 1/2014 | Johansen | H04L 65/607 |
| | | | 455/450 |
| 8,650,225 B2* | 2/2014 | Barrenechea | G06F 16/284 |
| | | | 707/803 |
| 8,831,623 B2* | 9/2014 | Weigand | H04L 43/00 |
| | | | 455/452.1 |
| 9,179,475 B2* | 11/2015 | Koleszar | H04L 45/32 |
| 9,307,413 B2* | 4/2016 | Lenzini | H04W 16/14 |
| 9,346,168 B2 | 5/2016 | Connell, II et al. | |
| 9,559,952 B2* | 1/2017 | Kapadia | H04L 45/741 |
| 9,720,480 B2* | 8/2017 | Gregory | G01D 9/005 |
| 9,762,435 B2 | 9/2017 | Shelton et al. | |
| 10,382,284 B1* | 8/2019 | Slupik | H05B 47/19 |
| 10,565,599 B2* | 2/2020 | Rodkey | G06Q 30/06 |
| 2004/0237094 A1* | 11/2004 | Vambenepe | G06Q 10/06 |
| | | | 719/328 |
| 2005/0201340 A1* | 9/2005 | Wang | H04L 43/50 |
| | | | 370/337 |
| 2005/0272430 A1* | 12/2005 | Griebling | H04W 84/22 |
| | | | 455/446 |
| 2006/0056368 A1* | 3/2006 | Ratiu | H04W 52/46 |
| | | | 370/338 |
| 2007/0266138 A1* | 11/2007 | Spire | H04L 63/1416 |
| | | | 709/223 |
| 2007/0288275 A1* | 12/2007 | Kumar | G06Q 10/0637 |
| | | | 705/7.36 |
| 2008/0192713 A1* | 8/2008 | Mighani | H04W 84/00 |
| | | | 370/338 |
| 2009/0189767 A1 | 7/2009 | Primm et al. | |
| 2010/0057520 A1* | 3/2010 | Rejai | G06Q 10/087 |
| | | | 705/7.36 |
| 2010/0235844 A1* | 9/2010 | Arwe | G06F 9/50 |
| | | | 718/104 |
| 2012/0084224 A1* | 4/2012 | Bhandar | G06Q 10/06 |
| | | | 705/342 |
| 2013/0075484 A1* | 3/2013 | Rhee | G01D 4/004 |
| | | | 236/1 F |
| 2013/0094538 A1* | 4/2013 | Wang | H04L 63/08 |
| | | | 375/141 |
| 2017/0178093 A1* | 6/2017 | Bull | G06Q 20/10 |
| 2017/0178245 A1* | 6/2017 | Rodkey | G06F 16/00 |

* cited by examiner

SYSTEM AND METHOD FOR MANAGING IT ASSET INVENTORIES USING LOW POWER, SHORT RANGE NETWORK TECHNOLOGIES

BACKGROUND

The present invention relates generally information technology (IT) asset management. More specifically, hardware devices serve as components in a mesh network for automatically reporting IT assets to a global asset management server via a collection server.

Information technology (IT) asset management is a business practice that supports life cycle management and decision making for such technology and includes all elements of software and hardware. IT asset management involves gathering detailed hardware and software inventory information which can then be used to help manage IT inventory and help organizations to manage their systems for effectively saving time and money by avoiding unnecessary asset purchases and promoting harvesting and recycling existing resources.

However, asset management is a big challenge for large enterprises which are required to manage very large numbers of servers. The server population is constantly changing since the servers are frequently activated, deactivated, moved, rebuilt, upgraded, or re-purposed. The challenge is magnified by frequent network topology changes and network restrictions. Existing asset management solutions use software applications to collect hardware and software inventory data over the enterprise's network and manual input and import mechanisms, which inevitably result in inaccurate data.

There are conventional Asset Management solutions for software asset management and configuration management, and RFID (Radio-Frequency Identification) tagging/barcodes for hardware inventory. These existing asset management software products and technologies rely on enterprise networks, which can be challenged by firewall/network restrictions, and RFID tagging/barcodes collect minimal, static inventory information.

SUMMARY

According to an exemplary embodiment, the present invention introduces a hardware-based solution which overcomes these conventional obstacles.

More specifically, in a non-limiting exemplary embodiment, a method of information technology (IT) asset management is described herein, the method including using a mesh network to report IT asset management data; and receiving the IT asset management data from the mesh network at a collection server.

Also described herein is an apparatus that includes a receiver/transmitter (R/T) unit; an antenna associated with the R/T unit and tuned to a frequency of an intended IT asset management system mesh network; a controller to control an operation of the apparatus to serve a role as either an asset management transmitter (AMT) or an asset management receiver (AMR) and to store registration information; and an interface circuit that permits power to be provided to the apparatus and permits the apparatus to communicate with an associated host device in an asset management system, such that the apparatus assumes a role in the IT asset management system as either an AMR or an AMT based on communication with an operating system of the associated host device.

Also described herein is an information technology (IT) asset management system that includes a global asset management server to receive and store IT asset information; and at least one collection server that receives asset information from at least one transmitting device reporting asset information from an associated asset device and that forwards the received asset information to the global asset management server via a secure network, such that the collection server receives the asset information from the at least one transmitting device via a secure mesh network.

DETAILED DESCRIPTION

Figure 1:
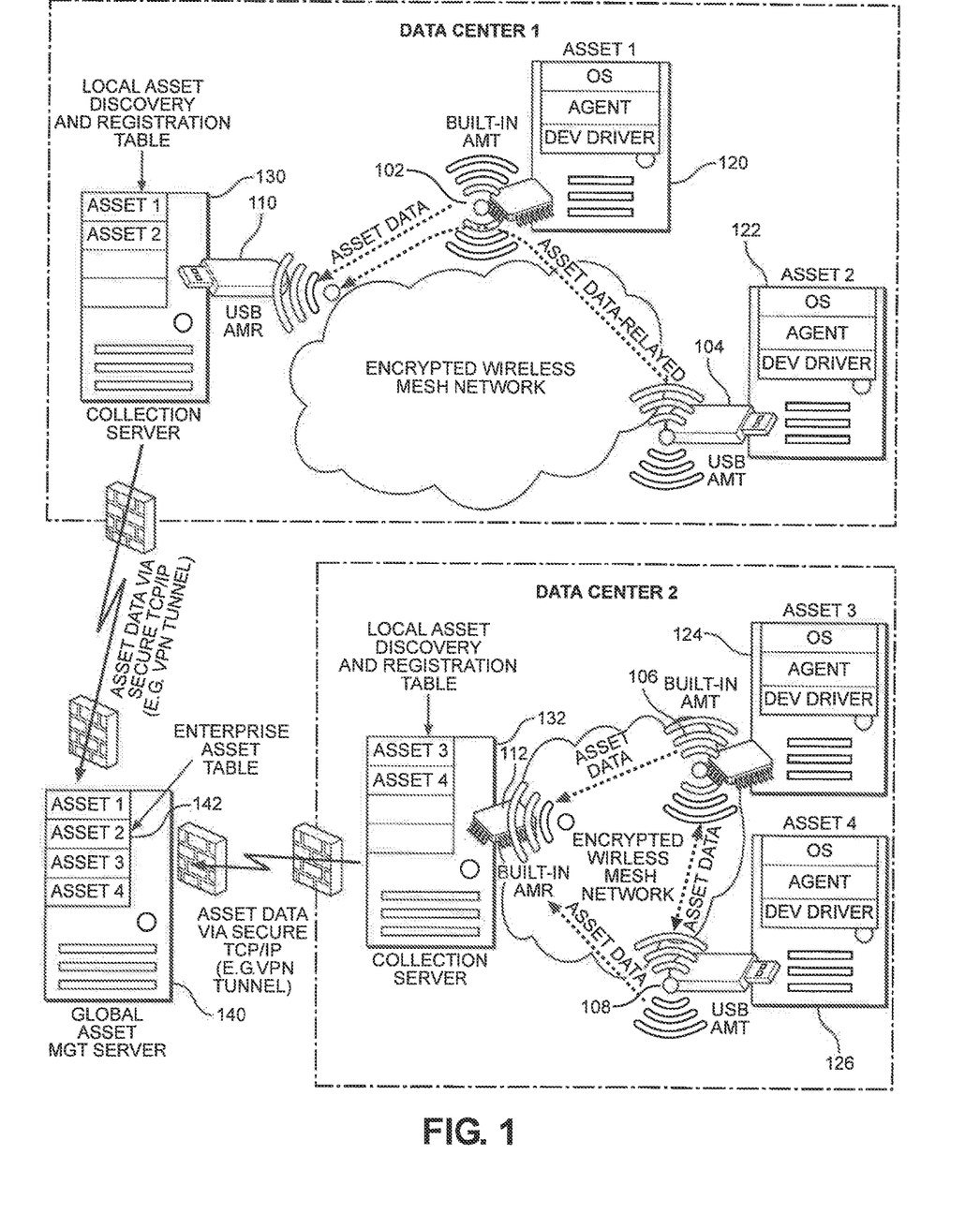
FIG. 1 exemplarily shows an IT asset management system according to the present invention.

With reference now to FIG. 1, the present invention introduces hardware devices, which serve as endpoint server transmitters 102, 104, 106, 108 and collection server receivers 110, 112. The collection servers 130, 132 communicate with a global asset management application in a server 140 serving the role of a global asset management server, using a TCP/IP-based secure communication protocol. The assets typically being managed in the context of the present invention are servers but it should be clear that other computer categories would be subject to asset management in this same system.

The invention introduces hardware devices which leverage local, low power, short range, mesh network and encryption technologies to reliably and securely collect and administer all asset management data, both software and hardware. As is well known in the art, a mesh network is a local network in which its nodes and infrastructure components such as the AMTs and AMRs of the present invention connect directly, dynamically, and non-hierarchically to as many other nodes as possible and cooperate with one another to transmit data through the mesh network. By using a mesh network having characteristics to address unique problems of IT asset management, the present invention overcomes all of the Transmission Control Protocol/Internet Protocol (TCP/IP) network topology changes and restrictions (e.g., network segmentation, firewalls, etc.) of conventional systems, to thereby provide high reliability collection of up-to-date hardware and software asset management data.

As exemplarily demonstrated in FIG. 1, the invention includes the following functional components:

Endpoint servers (e.g., assets) 120, 122, 124, 126

A transmitting device (e.g., Asset Management Transmitter (AMT) 102, 104, 106, 108

A receiving device (e.g., Asset Management Receiver (AMR) 110, 112

Satellite Collection Servers 130, 132 (typically one per Data Center or local network)

A Global Asset Management Application (e.g., application software module inside a Global Asset Management Server 140)

The Asset Management Transmitter (AMT)

The Asset Management Transmitter (AMT) is a hardware device that has its own radio transmitter and control circuit such as firmware. The AMT can be a device 102, 106 which is built into the endpoint server's mainboard 120, 124 (a built-in AMT), or a USB plug-in device 104, 108 (a plug-in AMT), thereby supporting compatibility with different vendors. The plug-in device permits the present invention to be readily implemented on legacy machines. Whether built-in or plugged-in, each AMT will each have its own node ID in the network. In a preferred embodiment, the AMT will perform data encryption on the asset data it reports in order to provide security for the asset management system.

The AMT will start transmitting as soon as it is powered on and will communicate to its server 120, 122, 124, 126 upon which it is installed/plugged-in to collect hardware information such as, for example, Vital Product Data, Manufacturer, Machine Type, Model, Serial, Firmware Levels. Upon initial powerup, an AMT will not yet be aware whether a mesh network with AMTs and an AMR has already been established. So the initial transmissions of an AMT will be an attempt to make connection with an already-established mesh network or to initiate a new mesh network itself. The IT asset information that is transmitted initially upon powerup is information that permits the AMT to identify its presence if a mesh network is already established. Therefore, the initial IT asset information transmitted upon powerup of an AMT is not asset information of its associated asset (e.g., endpoint server) that preferably is reported with a higher level of security, as described later. Only when the AMT establishes a secure connection with the AMR will the AMT begin transmitting the more sensitive IT information on the mesh network, using the higher level of security. The system can be configured as to which specific information is considered as more sensitive IT information for transmissions to the asset management database, since different enterprises might consider different IT information as requiring different security.

Once an operating system is active on the endpoint server 120, 122, 124, 126, the AMT will prompt the system administrator to install an agent on the endpoint server, if the AMT does not find one already installed. In a preferred embodiment, the agent would have been preinstalled as part of a software package on the endpoint server, for example, as part of an operating system and/or possibly in accordance with an industry standard that incorporates aspects of the present invention. Once the AMT and AMR have established a secure communication and basic initial communication established, only then can the installed software agent communicate to the AMT and report other asset management data of the host asset to the AMT, such as, for example, Operating System (OS) Version, IP addresses, Hostname, Device Driver levels, Licensed Products, etc. The agent running on the OS will be responsible for collecting the asset management data. By default, it will collect all asset management information, but the system administrator could optionally configure specific information to be collected from a server.

The agent runs in a configurable frequency, for example, once per day. This software agent is an optional component in an asset, but would be required if the enterprise wants to collect complete operating system and software asset management data in accordance with the present invention. However, at a minimum, the AMT will transmit a heartbeat message to the AMR via the mesh network at a configurable frequency, which heartbeat message can then be used by a data management system to detect server de-activations or server moves, for example, to a different data center or network location.

Thus, even if a software agent is not installed on an asset associated with an AMT, whether built-in or plugged-in, the AMT would still be capable of reporting the presence in the system of an associated asset, by reason that the AMT receives its power from its associated asset. As soon as a plug-in AMT is plugged-into a powered-up asset or as soon as an asset with a built-in AMT or plugged-in AMT is powered-up, the AMT will power up and will be able to report at least the presence of an associated asset node, even if no software agent has been installed in its associated asset.

Although the primary role of the AMT is to serve as an interface to an asset being managed, the AMTs can also serve as a repeater in the mesh network, as indicated in FIG. 1, so that assets with AMTs that are out of range of the collector server 130, 132 can still maintain contact with the collection server. Once an AMT is powered up, and even if it has not yet established a secure contact to an AMR, it monitors for any possible mesh network transmissions and is capable of serving as a network repeater of any received activity. Thus, any powered-up AMT can potentially serve as a repeater in a mesh network when located in a routing path, as is well known in conventional mesh network technologies.

The Asset Management Receiver (AMR)

The Asset Management Receiver (AMR) is also a hardware device that will have its own radio receiver and controller, such as firmware. The AMR is responsible for receiving all the AMT transmissions on its associated mesh network and performing decryption of messages received from AMTs before passing it to its host machine, in this case the mesh network local collection server. Similar to the concept of the AMTs, the AMR can be either a plug-in device [e.g., a USB AMR 110) or a built-in AMR 112.

Although FIG. 1 shows the AMR and AMT as potentially different hardware devices, in a preferred embodiment, the same hardware can serve as either an AMR or an AMT with different functions defined based on software on their associated host machine. For example, additional software on the collection server establishes an AMT/AMR device as having the AMR in the mesh network (and software on an end server establishes an AMT/AMR device as having an AMT role for its associated host machine). The AMR administers network participation, such that the AMR and the AMTs form a mesh network based on existing technologies for low power, short range, mesh network, and encryption technologies.

For example, the mesh network used in the present invention has some similarities to the Z-Wave wireless mesh network, which is a conventional wireless ad hoc network protocol used primarily for home automation and that allows for low-energy radio waves to communicate from appliance to appliance. This Z-Wave protocol has evolved to permit wireless control of residential appliances, as well as other devices such as lighting controls, security systems, thermostats, windows, locks, swimming pools, and garage door openers. A device in a Z-Wave network can communicate to another network device outside its transmission range, provided that one or more intermediate node devices are available to serve as repeater nodes. In order to be included in a Z-Wave network, a device must be "paired" or "added", as usually achieved in Z-Wave by pressing a sequence of buttons on a network controller and on the device being added to the network. Such pairing needs to be done only once in the Z-Wave protocol.

Although the mesh network of the present invention has some similarities to the Z-Wave network, there are differences due to its different application serving in an IT asset management function. For example, the AMT of the present invention will automatically attempt to pair itself to an AMR upon powerup, and an AMR upon powerup will attempt to establish contact with possible AMTs within range.

Another difference from the Z-Wave protocol is that the mesh network of the present invention will, in a preferred embodiment, have multiple levels of security. The lower level of security is used by the AMT upon initial powerup and before the AMT pairs up with the operating system of its associated asset, when the AMT initially transmits its presence to a presumed AMR on a presumed mesh network, providing its own less secure IT asset information. Once the AMT has been paired up to an AMR and has paired up to the operating system of its associated asset, the second level of security will be used to transmit the more secure IT asset information of the associated asset such as an endpoint server.

The AMR, after confirming its authority for the mesh network, is the collection point that receives and forwards device information for the devices to the repository/collection server. This approach overcomes all TCP/IP network topology changes and restrictions such as, for example, network segmentation, firewalls, etc.

The Collection Servers

The collection server 130, 132 is responsible for each data center's data, thereby allowing the data center manager to manage their own domain. The collection server also serves as an interface to the global asset management server 140, typically using a secure TCP/IP such as a virtual private network (VPN) tunnel. This satellite collection server 130, 132 also serves as the configuration point for the AMR(s), so as to control the AMT registration, to be one of two types:

Pre-registration type: In this registration type, the AMT's node ID is predefined in the collection server before the device is deployed to the server.

Post-registration type: In this registration type, the AMT will appear as an undefined reporting AMT, and the user such as the system administrator would have to accept its attempt to join the mesh network without a pre-assigned AMT node ID. The collection server 130, 132 thereby can detect servers 120, 122, 124, 126 in the enterprise network which are themselves no longer "reporting a heartbeat", for whatever reason. This capability allows the system administrator to recognize servers which may have been deactivated or moved.

The collection servers 130, 132 will upload contents to the global asset management application at a configurable frequency. In a preferred embodiment, the data between the satellite collection servers 130, 132 and the global asset management server 140 is encrypted, using, for example, a TCP/IP-based secure communication protocol.

The Global Asset Management Server

The global asset management server 140 has installed thereon a global asset management application that receives data via the TCP/IP protocol from all satellite collection servers 130, 132 and decrypts the received data. The received data is stored in a database such as an enterprise asset table 142. The global asset management application also consolidates the data collected from the collection servers and can, for example, detect when a server is moved to a new location.

The TCP/IP interface between the collection servers 130, 132 and the global asset management server 140 could be via Internet, with dedicated hardware servers. But it should also be clear that the collection server/global asset management server roles could be provided via a cloud service.

Additionally, the exemplary configuration shown in FIG. 1 shows the collection servers 130, 132 and the global asset management server 140 as distinct and separate components interconnected as a network. Such dispersed system is appropriate for larger enterprises. However, it should be clear that smaller organizations might be better served by combining the collection server and global asset management server roles into a single server serving both roles.

As exemplarily shown in FIG. 1, the collection server function is uniquely associated with one mesh network of AMTs. However, a single computer, such as a server, can service multiple mesh networks as long as different AMR devices on that single computer are each uniquely associated with its own respective different mesh networks, where each different mesh network is tuned to its own frequency, if necessary, since a mesh networks could function using a common frequency with different networks being distinguished based on a sequence of pulses rather than different frequencies.

It should also be clear that a single global asset management server 140 could service more than one enterprise/organization, in which scenario, the global asset management server 140 would be separated into separate applications and databases for each enterprise/organization. This sharing of global asset management server roles could optionally be implemented as a cloud service.

Moreover, the present invention can also be used to manage assets used to form a cloud service. That is, even though a cloud service provides virtual machines to users who do not know or care what actual hardware computers underly their cloud service, the hardware devices underlying the cloud service, which implement the virtual machines provided by the cloud service, can be managed using the IT asset management system of the present invention. In this case, the enterprise providing the hardware and software underlying a cloud service can use the present invention to manage the assets underlying the cloud service.

The AMT/AMR Architecture

Figure 2:
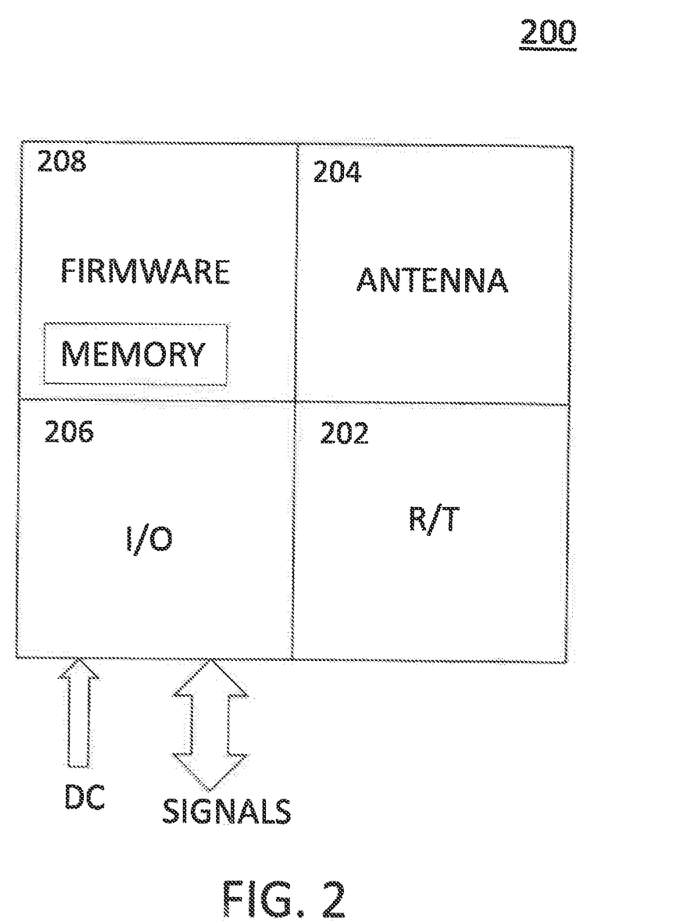
FIG. 2 exemplarily shows in block diagram format an exemplary embodiment for the Asset Management Transmitter (AMT) and Asset Management Receiver (AMR) of the present invention.

FIG. 2 shows in block diagram format an exemplary architecture 200 for the AMTs and AMRs. Both the AMT and AMR functions can be implemented as a single chip, such as an ASIC (Application Specific Integrated Circuit), and, in a preferred embodiment, the same hardware can be used for both the AMT and AMR functions. In this preferred embodiment, the selection of which function (AMT or AMR) is implemented depends upon input from the software (e.g., operating system) of the unit to which the hardware circuit is associated. Other configurations are possible, for example, using a program pin to define the role of identical hardware device capable of assuming either role, or using different hardware devices for the two different roles. However, since both the AMT and the AMR functions must interface with its associated server or other asset, the preferred and more economical configuration is to use identical hardware modules for both the AMT/AMR, as designed to then receive a definition of its functionality from its associated asset via software.

From the descriptions above, it should be clear that both the AMT and the AMR would include a receiver/transmitter (R/T) module 202 and associated antenna 204 tuned to a frequency of an intended mesh network. The mesh network of the present invention is not intended as limited to a network having its own unique frequency defining that network, since a universal frequency could be used, with different networks being distinguishable based on transmitting a unique sequence of pulses or other distinguishing mechanism.

Power terminals and signal terminals interface with the server associated with the AMT/AMR device via an interface section 206. The controller 208 includes control circuits, such as firmware and memory, including a non-volatile memory device to store registration information of the AMT/AMR device itself, as well as a volatile memory device to store asset information received from its host machine operating system. If the AMT/AMR device is a built-in device, the ASIC would be exemplarily mounted as a chip on the server motherboard so that the power/signal interface of the AMT/AMR would be connected to terminals of the mainboard. If the AMT/AMR device is a plug-in device, the ASIC chip would be, in a preferred exemplary embodiment, part of a portable device similar to, for example, other plug-in devices such as a portable USB thumb drive or memory drive or a Bluetooth USB drive. This plug-in embodiment allows the present invention to be easily incorporated into legacy machines that would not have the AMT/AMR chip installed on the mainboard, thereby permitting the present invention to be implemented on legacy systems.

The IT Asset Management Mesh Network

Figure 3:
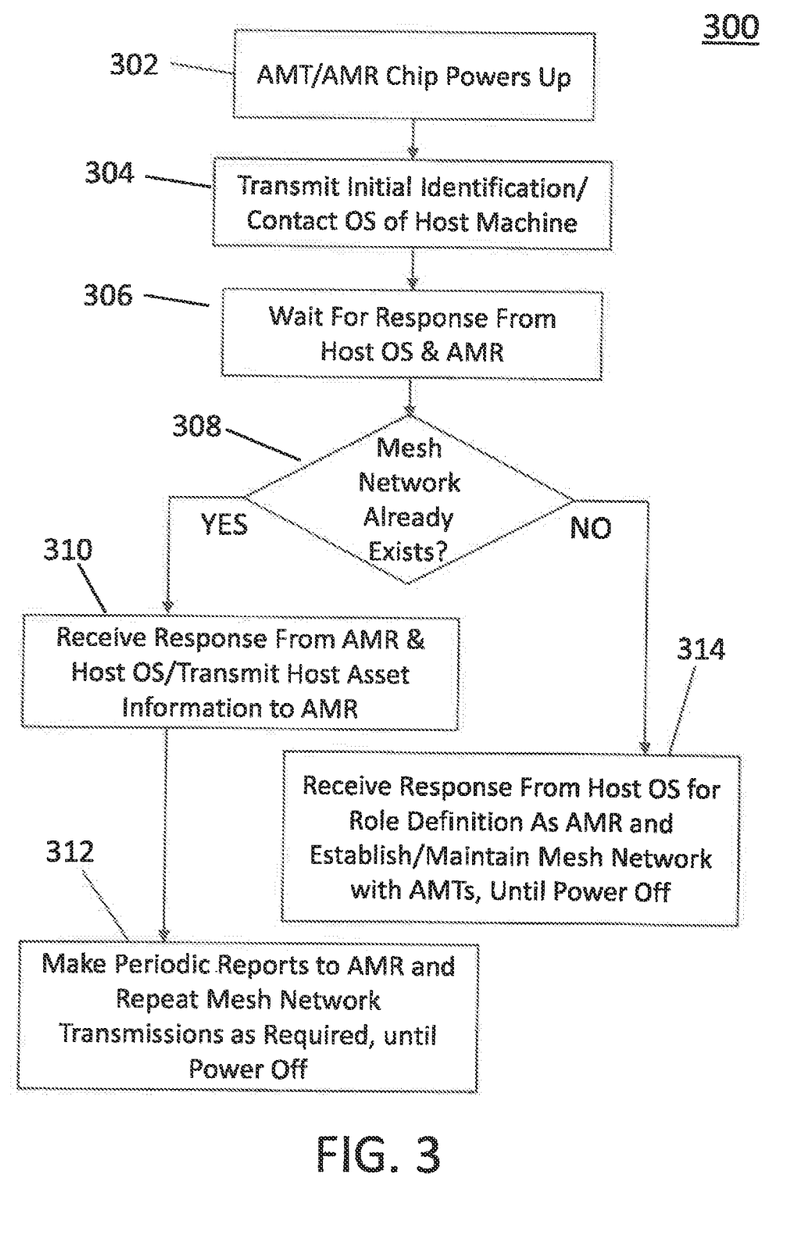
FIG. 3 shows in flowchart format 300 a power-up sequence of an AMT/AMR device and operation of the mesh network.

FIG. 3 shows a flowchart that demonstrates operation of the mesh network of an exemplary embodiment of the present invention, from power-up of an AMT/AMR device in step 302, until the device loses power in step 312 or 314, by way of having its host machine lose power or by way of unplugging a plug-in AMT/AMR device from its host machine. This explanation presumes that the AMT and AMR use a common hardware chip so that, upon initially receiving power as either a component of a motherboard or as a plug-in device, the AMT/AMR device does not know at initial power-up whether its role in the system is to serve as an AMT or an AMR.

Therefore, in step 304, without even knowing its role or whether the system mesh network has already been established, upon initial power-up, the chip automatically transmits its own registration information to a presumed AMR (or AMT) on a presumed mesh network and attempts to contact its host device's operating system (OS). In a preferred embodiment, even this initial report is encrypted, in order to maintain network security and even though the information of the initial transmission might not be considered by the enterprise operating the IT asset management system as being information that is confidential. This automatic reporting feature allows the system to become aware of machines that have been moved or relocated. The automatic contact with the host machine OS permits the dual-purpose chip to learn whether it will serve the role of an AMT or an AMR since the host machine will include software serving as an agent for the IT asset management system of the present invention. The contact with the OS also permits the AMT/AMR chip serving as an AMT role to receive additional asset information that will be subsequently reported to the AMR in a more secure channel that is established once the mesh network and system AMR are operational.

In step 306, the powered-up AMT/AMR device awaits a response from both its host machine OS as well as listening for a response on the mesh network to determine whether the mesh network and AMR are already established, in step 308.

If the mesh network is already established, then in step 310, the AMT/AMR device learns of its existence by receiving a response from the system AMR associated with the collection server of that mesh network, along with a request from the AMR to set up a secure channel to report asset information that is more confidential than the information initially reported at power-up. Once the AMT/AMR device receives a response from its associated machine OS, it will also receive this additional asset information and will report it to the AMR via a second, more secure level. In step 312, the AMT/AMR device remains a part of the mesh network, serving as an AMT role until it is powered-off. During this time, the AMT will periodically report asset information to the AMR in accordance with the preset time interval and will listen on the mesh network for messages to repeat, as necessary.

In step 314, if no mesh network currently exists upon power-up and the AMT/AMR device receives a response from its associated host machine that it is associated with the collection server, then the AMT/AMR device learns that it will serve as the AMR role in the mesh network. The AMR will then establish and maintain the mesh network until it loses power, either by having its associated host machine turned off or by being unplugged as an AMT/AMR device from its host machine.

Figure 4:
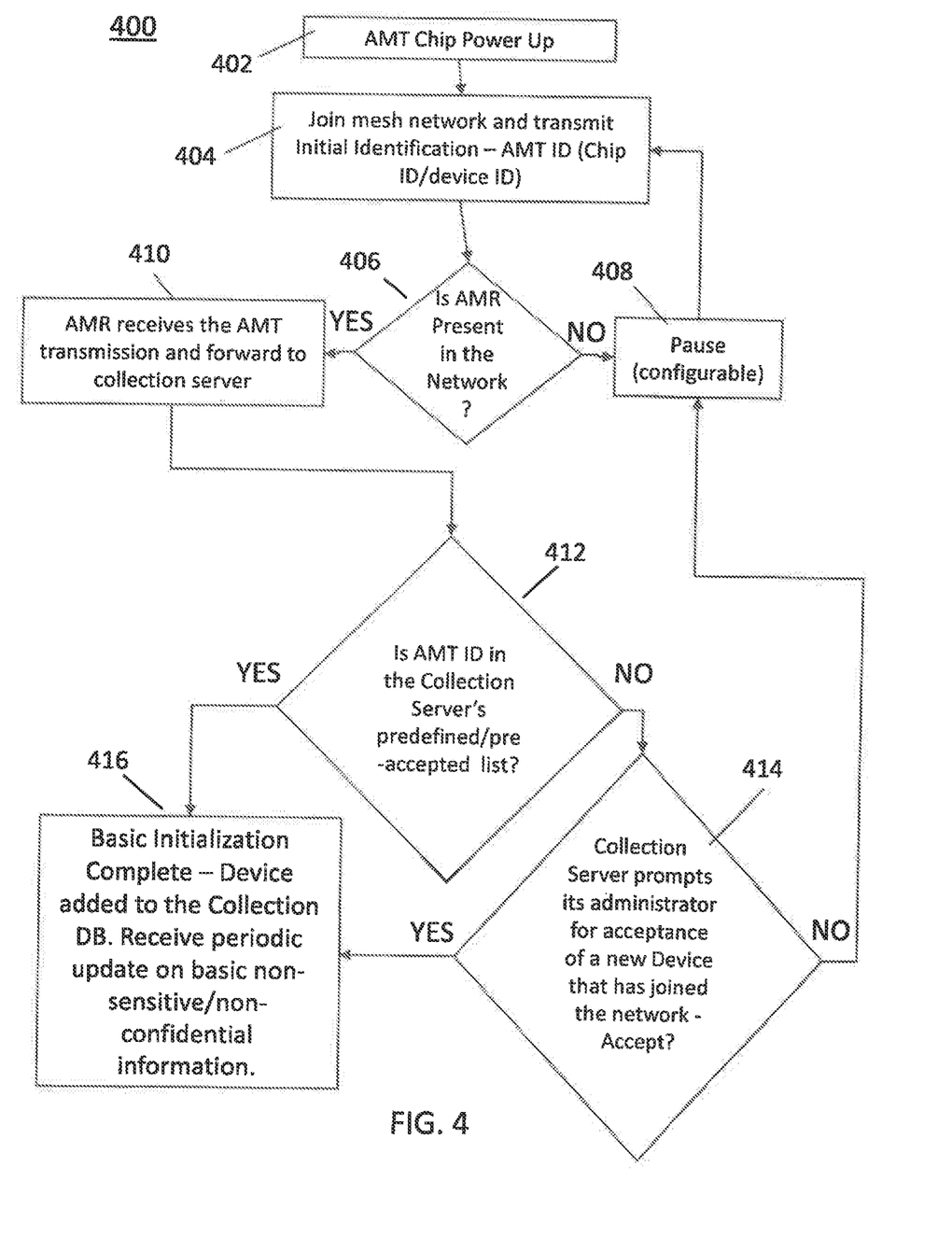
FIG. 4 shows additional details of the basic data collection flow.

FIG. 4 shows additional details of the mesh network during the basic data collection flow 400 immediately upon power up in step 402 of a chip destined to serve an AMT function. In step 404 the newly-powered chip will attempt to join a mesh network by transmitting its initial identification such as its chip ID/device ID, using a low level of security by encrypting its initial data using encryption customary in most conventional mesh network technologies. The data considered appropriate to be initial data report is configurable by each enterprise.

In step 406, the chip listens for a response from an AMR. If no AMR is detected, in step 408, the chip pauses a preconfigurable period of time before making another attempt to join a mesh network, by returning to step 404. The preconfigurable period of time can be a default value such as 24 hours. If a mesh network is active and its AMR is present, then in step 410 the mesh network AMR will receive the initial identification data from the recently powered-up chip and will forward the received information to its associated collection server.

In step 412 the collection server will check to determine if the AMT ID is registered in its predefined/pre-accepted list of AMTs. If no predefined/pre-accepted ID in the collection server's database matches the received AMT's ID, then the collection server prompts the system administrator for acceptance in step 414. If the administrator fails to timely accept the new device, the AMT becomes dormant for a configurable, predetermined time period. If the AMT ID is confirmed in step 412, or if the system administrator accepts the new AMT ID in step 414, then in step 416 the basis initialization for the new AMT is complete and the device is added to the collection server's database if not preregistered, and the newly-recognized AMT will periodically provide updated basic non-sensitive/non-confidential information.

Figure 5:
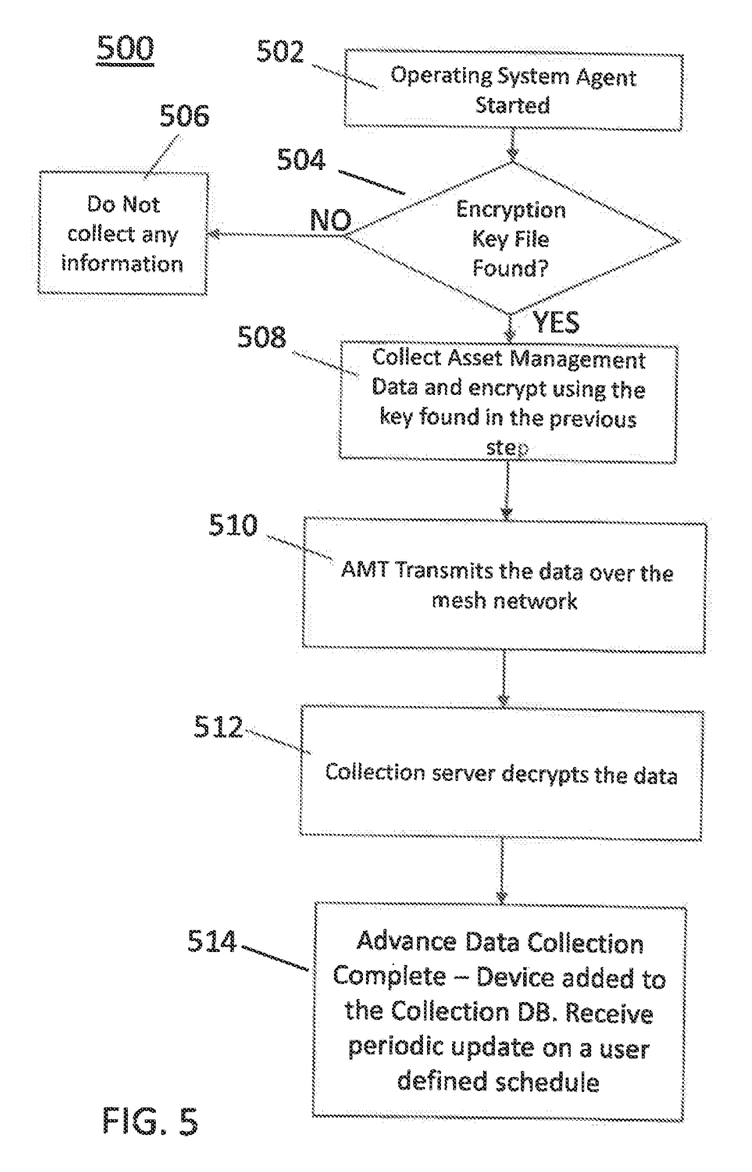
FIG. 5 shows additional details of the advance data collection.

FIG. 5 shows in more detail the flow 500 in the mesh network for the advance data collection during which the more confidential IT data is transmitted to the collection server, using a second, more secure transmission mechanism than the less secure transmissions used by the AMT in its initial transmission of step 404 in FIG. 4. In step 502 the AMT, after its initial powerup, will request its associated asset to initiate the IT asset management agent, as typically stored in its operating system of the host machine. The more secure mechanism used in the advance data collection shown in FIG. 5 relies on conventional private key/public key encryption, with the collection server providing the public key to each managed asset on its mesh network.

Thus, in step 504, the newly-started agent checks to determine if an encryption file containing a public encryption key is found in memory of the managed asset. In step 506, if the agent finds no public encryption key, then the agent does not collect any IT asset information from its host machine and will remain in this non-reporting mode until a public encryption key is supplied from the collection server via a secure connection.

If the agent finds a public encryption key, then in step 508 the agent collects asset management data from its host and encrypts this data and forwards the encrypted data to the AMT, which in turn transmits the encrypted data over the mesh network in step 510.

In step 512, the collection server decrypts the data received via its associated AMR, using the private key associated with the public key previously sent to the host server providing the asset information. In step 514, the advance data collection report is complete, with the newly-activated AMT device added to the collection database, along with its reported. The AMT will periodically send the collection server update IT information reports from its host server, using a user-defined update schedule.

The Collection Server/Global Asset Management Server Connection

As shown in FIG. 1, the interconnection between the collection servers 130, 132 and the global asset management server 140 is exemplarily implemented as a VPN tunnel in a secure TCP/IP protocol using two hardware servers. It would also to be understood by one of ordinary skill that, although this disclosure includes a detailed description on cloud computing, as follows, implementation of the teachings recited herein are not limited to a cloud computing environment. Rather, as exemplarily shown in FIG. 1, embodiments of the present invention are capable of being implemented in conjunction with any other type of computing environment now known or later developed.

It would also to be understood by one of ordinary skill that although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
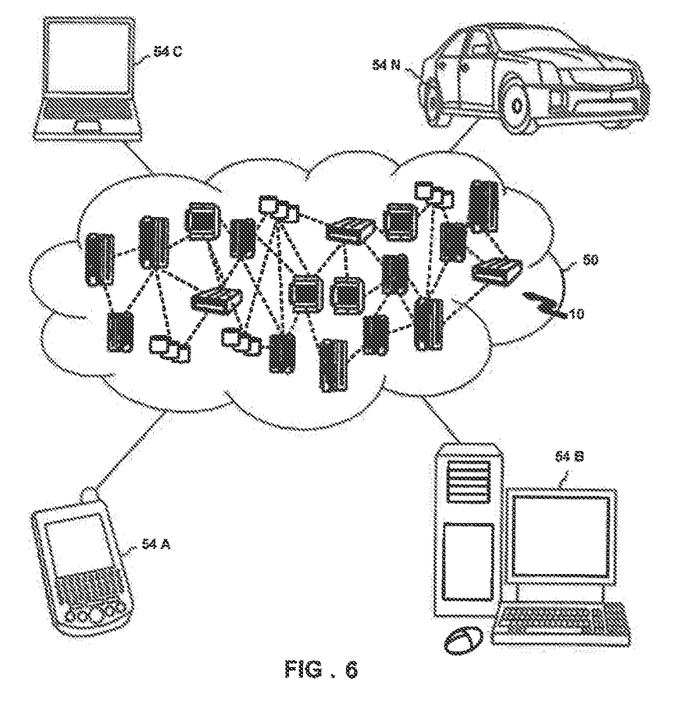
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
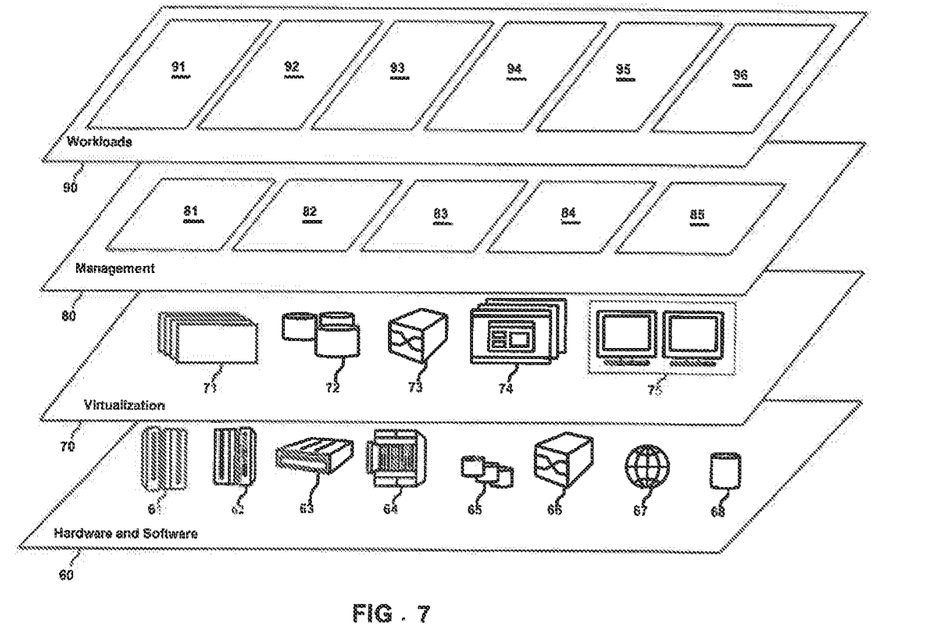
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention since the software for the global asset management tool could be stored and executed by the global asset management server, including, for example, establishing and a VPN tunnel to transmit asset management data between the collection servers and the global asset management server 91, access of asset management data system by a system administrator via a collection server including tasks such as maintenance of the asset management database 92, sending/receiving queries 93 relative to the asset management database, overall management 94 of the IT asset management system by a capability to interact with each collection server in the system via the global asset management server, control of agents 95 located throughout the system by a system administrator, or implementing 96 other tasks related to the IT asset management system via the global asset management server.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of information technology (IT) asset management, said method comprising:
    establishing a mesh network to report IT asset management data from a plurality of asset devices; and
    receiving the IT asset management data from the mesh network at a collection server or a plurality of collection servers,
    wherein the mesh network includes a transmitter, and a receiver that automatically connect to each other during a predetermined condition using a secure protocol.

2. The method of claim 1, further comprising:
    forwarding the IT asset management data from the collection server to a global asset management server; and
    storing the forwarded IT asset management data in a global asset management database,
    wherein the IT asset management data is acquired by one or more asset management transmitters (AMTs) and the IT asset management data is received at the collection server by an asset management receiver (AMR), and
    wherein the AMT and AMR automatically connect to each other under a predetermined condition.

3. The method of claim 1, wherein:
    the IT asset management data is acquired by one or more asset management transmitters (AMTs) that are respectively associated with IT asset devices and that report the asset information of its associated asset device to the collection server via the mesh network, and the mesh network that reports the IT asset management data to the collection server is comprised by the AMTs respectively associated with IT asset devices.

4. The method of claim 3, wherein the AMTs respectively comprise one of:
   an AMT that is a built-in AMT mounted on a motherboard of its associated IT asset device; and
   an AMT that is a plug-in AMT that is plugged into a USB port of its associated IT asset device.

5. The method of claim 3, wherein an AMT automatically reports initial asset information to the collection server upon being powered up.

6. The method of claim 1, wherein:
   the IT asset management data is received at the collection server by an asset management receiver (AMR), and
   the mesh network that reports the IT asset management data to the collection server is further comprised by the AMR.

7. The method of claim 5, wherein the AMR comprises one of:
   an AMR that is a built-in AMR mounted on a mainboard of the collection server; and an AMR that is a plug-in AMR that is plugged into a USB port of its associated collection server.

8. The method of claim 1, wherein the mesh network is a secure network through a secure network protocol, and
   wherein the mesh network includes a transmitter and receiver that automatically connect to each other during a predetermined condition including a powerup of the transmitter or receiver.

9. The method of claim 2, wherein communications between the collection server and the global asset management server occur as a secure communication, and
   wherein the mesh network includes a plurality levels of security.

10. The method of claim 2, wherein a global asset management server function is provided as a cloud service, and
    wherein the mesh network includes a transmitter and a receiver providing redundancy in communication.

11. The method of claim 2, wherein functions of the collection server and the global asset management server are provided in a single machine.

12. An apparatus, comprising:
    a receiver/transmitter (R/T) unit;
    an antenna associated with the R/T unit and tuned to a frequency of an intended IT (information technology) asset management system mesh network;
    a controller to control an operation of the apparatus to serve a role as either an asset management transmitter (AMT) or an asset management receiver (AMR) and to store registration information; and
    an interface circuit that permits power to be provided to the apparatus and permits the apparatus to communicate with an associated host device in an asset management system,
    wherein the apparatus assumes a role in the IT asset management system as either an AMR or an AMT based on communication with an operating system of the associated host device.

13. The apparatus of claim 12, as comprising one of:
    a chip in a package mounted on a mainboard of its associated host device; and
    a chip in a plug-in device to be plugged into an input connector of its associated host device.

14. The apparatus of claim 12, wherein the apparatus automatically transmits initial asset information upon being powered up.

15. The apparatus of claim 12, as configured to listen to the IT asset management system mesh network and to automatically repeat transmissions that it receives.

16. The apparatus of claim 12, as configured to transmit IT asset data in a secure manner.

17. An information technology (IT) asset management system, comprising:
    a global asset management server to receive and store IT asset information; and
    at least one collection server that receives asset information from at least one transmitting device reporting asset information from an associated asset device and that forwards the received asset information to the global asset management server via a secure network,
    wherein the collection server receives the asset information from the at least one transmitting device via a secure mesh network,
    wherein the mesh network includes a transmitter, and a receiver that use a secure protocol.

18. The IT asset management system of claim 17, wherein each of the at least one transmitting device associated with an asset device comprises an AMT/AMR module that can selectively assume a role in the IT asset management system as one of:
    an asset management transmitter (AMT) that is associated with an asset device and transmits asset information of its associated asset device via the secure mesh network; and
    an asset management receiver (AMR) that is associated with the collection server and that receives asset information via the secure mesh network from AMTs each associated with a respective asset device.

19. The IT asset management system of claim 18, wherein each AMT/AMR module comprises one of:
    a chip in a packet mounted on a mainboard of its associated machine; and
    a chip in a plug-in device that can be plugged into a plug-in input port of an associated machine.

20. The IT asset management system of claim 18, wherein the AMT/AMR module automatically transmits an initial asset report upon being powered up.

* * * * *